United States Patent [19]
Pons

[11] Patent Number: 4,638,219
[45] Date of Patent: Jan. 20, 1987

[54] APPARATUS FOR ADJUSTING THE POSITION OF A DEFLECTOR ON A TELEVISION TUBE, PARTICULARLY A COLOR TUBE

[75] Inventor: Claude Pons, Rome, Italy
[73] Assignee: Videocolor, Montrouge, France

[21] Appl. No.: 603,047
[22] Filed: Apr. 23, 1984
[30] Foreign Application Priority Data
Apr. 26, 1983 [FR] France ................................ 83 06834
[51] Int. Cl.⁴ ........................ H01J 29/70; H04N 5/655
[52] U.S. Cl. ...................................... 315/368; 358/249
[58] Field of Search ................ 315/368; 358/248, 249, 358/10; 335/212

[56] References Cited
U.S. PATENT DOCUMENTS
3,950,720 4/1976 Shrader .............................. 358/248
4,163,308 8/1979 Tawa et al. .
4,360,839 11/1982 Ragland, Jr. et al. .............. 358/249

*Primary Examiner*—Theodore M. Blum
*Assistant Examiner*—D. Cain
*Attorney, Agent, or Firm*—Pollock, VandeSande & Priddy

[57] ABSTRACT

An apparatus for adjusting the position of the deflector of a television tube, particularly a color tube, especially so that the tube deflector assembly may become autoconvergent. The apparatus comprises a platform movable in accordance with n degrees of freedom and n elements such as arms, each of which has its displacement controlled in accordance with only one degree of freedom, for example a simple translatory displacement in order to assure the mobility of the platform in accordance with the n degrees of freedom.

5 Claims, 5 Drawing Figures

APPARATUS FOR ADJUSTING THE POSITION OF A DEFLECTOR ON A TELEVISION TUBE, PARTICULARLY A COLOR TUBE

BACKGROUND OF THE INVENTION

This invention relates to an apparatus for adjusting the position of a deflector on a television tube, particularly a color tube of the shadow mask type.

It is known that the reproduction of the images is obtained in television by displacement of a luminous dot along horizontal lines from left to right and from top to bottom, the intensity and color of the dot being a function at each instant of the intensity and color of the corresponding point of the image which is to be reproduced. To this end, a television tube comprises a screen on which are deposited luminophoric substances which emit light when they are struck by an electron beam. This beam is generated by an electron gun within the tube and the displacement of the electron beam; along the lines, for displacement of the luminous dot, is obtained by varying the magnetic fields produced by variable currents in coils known as deflectors or deflection yokes.

The positioning of the deflector with respect to the tube should be made with particular care, since any error in this positioning is manifested by an alteration of the image reproduced on the screen.

The adjustment of the deflector position with respect to the tube is particularly critical, especially for color television tubes, particularly if an automatically convergent system is required, which does not necessitate corrections performed by the circuits associated with the deflector-tube assembly. In a color television tube, the screen is actually coated with triplets of luminescent substances, each element of the triplet having one of the primary colors red, green and blue, and three electron guns are provided, each gun being intended to energize a particular color. Thus, in an autoconvergent tube, it is the deflector which assures convergence of the three electron beams throughout the screen surface. Furthermore, each electron beam should reach only the phosphors of the corresponding color. The convergence is effected by a displacement of the deflector parallel to the screen, while the purity of the color (the beam intended for one color only reaching the phosphors of this color) is adjusted by displacement of the deflector perpendicular to the screen.

Until now, these adjustments are peformed either in wholly manual manner, for example by means of rubber wedges between the deflector and the tube, or by means of a mechanism. In this latter case, the deflector is mounted on a platform displaceable with respect to a frame to which is secured the tube as such, and an operator performs the adjustment by displacement of the platform within several degrees of freedom, until an image having a minimum of defects is obtained on the screen.

The means permitting the control and displacement of the deflector support are formed by a mechanism comprising a carriage and a rocker, which is comparatively complicated. Furthermore, the adjusting operation is difficult since it causes several parameters to come into play at the same time; moreover, it is tiresome since the operator must watch the luminous screen constantly.

To eliminate these shortcomings, an apparatus has already been proposed (U.S. Pat. No. 4,360,839) for adjusting the position of a deflector with respect to a color television tube of the autoconvergent type, which comprises a support movable along n degrees of freedom and n arms of which the individual displacement is operated along a single degree of freedom, for example by simple translation, in order to establish the mobility of the support along the n degrees of freedom. Each arm is situated along an axis of the tube or along a perpendicular axis. Complex arrangements are provided in this known apparatus in order that the displacement of one arm affects the position of the deflector along one axis only of the tube.

Moreover the known apparatus is not well suited for mass production because the mounting and the removal of the tube-yoke assembly are not operations easy to perform; the mounting and the removal of the energizing means of the tube - the necessity of which results from the necessity to check on the screen that the adjustment has been correctly done are also uneasy operations.

The apparatus in accordance with the invention does not have these disadvantages.

SUMMARY OF THE INVENTION

The invention is characterized in that all the elements of which the control of the displacement corresponds to one degree of freedom are of identical structure, and in that the support has a platform which is horizontal in its mean position and is carried by n inclined arms evenly distributed around the deflector, each having a translatory displacement control means situated at its base.

The automatic loading of the tube onto the platform and the adjustments are easy to carry out in view of the horizontal positioning of the platform and of the oblique direction of the arms evenly distributed around the deflector. Furthermore, a substantial space may be provided for the tube supply devices between the arms, below the platform. Moreover, the stresses being more satisfactorily distributed over the arms, these may be dimensioned in a less substantial manner than in the known apparatus.

The apparatus according to the invention may be completely automated. For this purpose, use is made of known means of measuring convergence errors, such as those described in French Pat. No. 80 07412 in the applicant's name—and of means of measuring the purity margin of a tube as described in U.S. Pat. No. 4,001,877, and of a computer programmed to select the elements which should be actuated by linear displacement and the value of these displacements, in order to perform the adjustment as a function of the measurements made on the screen. A calibration has to be performed before organizing the computer program, that is to say taking precise readings of the results of the different displacements of the deflector along each of its degrees of freedom on the convergence and the purity of the image reproduced on the screen. A calculation may be undertaken for this calibration, instead of having recourse to empirical measures. The program, which lies within the capabilities of one versed in the art, varies as a function of the type of tube which is to be controlled.

To simplify the automation, it is advantageous to operate the linear displacement of each element by means of an electric motor. The rotary motion of the electric motor is converted into a linear displacement, for example by means of a screw.

In one embodiment, each linear displacement element is connected to the deflector support via an arm of which one end is connected via a knee joint to the said element and the other end is connected to the support via another knee joint. These knee joints are, for example, flexible rods whose extremities are inset within the elements they interconnect. The first flexible rod forming a knee joint is engaged on the one hand in the linear displacement element and in the arm on the other hand, whereas the second knee joint is engaged with one extremity in the said arm and with the other extremity in a connecting device secured to the platform.

In a manner known per se, the number n of linear displacement elements is preferably equal to six, which permits displacement of the support in all directions. As a matter of fact, the spatial position of a solid is determined by six parameters (corresponding to the six degrees of freedom): three coordinates for the position of a point of this solid, and three other coordinates for the directional setting of the solid in space.

Upon providing an adjustment in accordance with six parameters by means of six linear displacement elements of which each is joined to the platform via an arm articulated to the corresponding element and to this platform, it has been discovered that the elements and arms operate in optimum conditions, that is to say with minimum forces, if the articulations of the arms on the support are arranged in pairs close to the corners of an equilateral triangle in the plane of the platform, if the horizontal projection of each arm at rest is perpendicular to one side of this equilateral triangle, and if the arms and axes of translation subtend an angle of 45° with the vertical.

BRIEF DESCRIPTION OF THE DRAWINGS

Other features and advantages of the invention will appear from the following description of some of its embodiments, given with reference to the accompanying drawings, in which.

DESCRIPTION OF THE PREFERRED EMBODIMENTS

Figure 1:
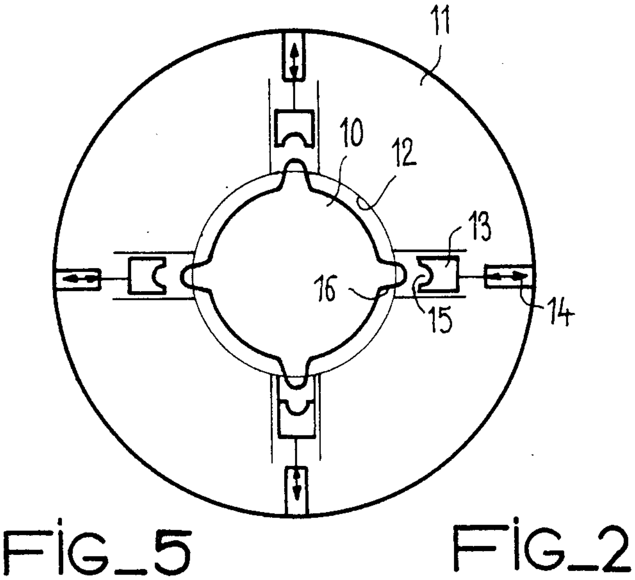
FIG. 1 is a diagrammatic plan view of a platform, a deflector and of means for securing the deflector.

In this embodiment, the apparatus for adjusting the position of a deflector 10 with respect to the screen $10_1$ of a color television tube $10_2$ comprises a horizontal platform 11 of generally circular shape having a central opening 12 forming a reception location for the deflector 10.

This deflector 10 is secured to the platform 11 by means of jaws 13, the displacement of each of these being controlled by a ram 14. The extremity of each jaw 13 comprises a notch 15 cooperating with a projection 16 at the periphery of the body of the deflector. These jaws equally assure the centering of the deflector on the platform.

The platform 11 is carried by six arms or legs 17,18, 19,20,21 and 22, each of these being displaceable in order to cause the position of the platform 11 and consequently that of the deflector 10 to vary with respect to the tube. Each arm assures the mobility of the platform 11 and consequently also that of the deflector 10, in accordance with one degree of freedom. The arms 17 to 22 are identical to each other.

Figure 4:
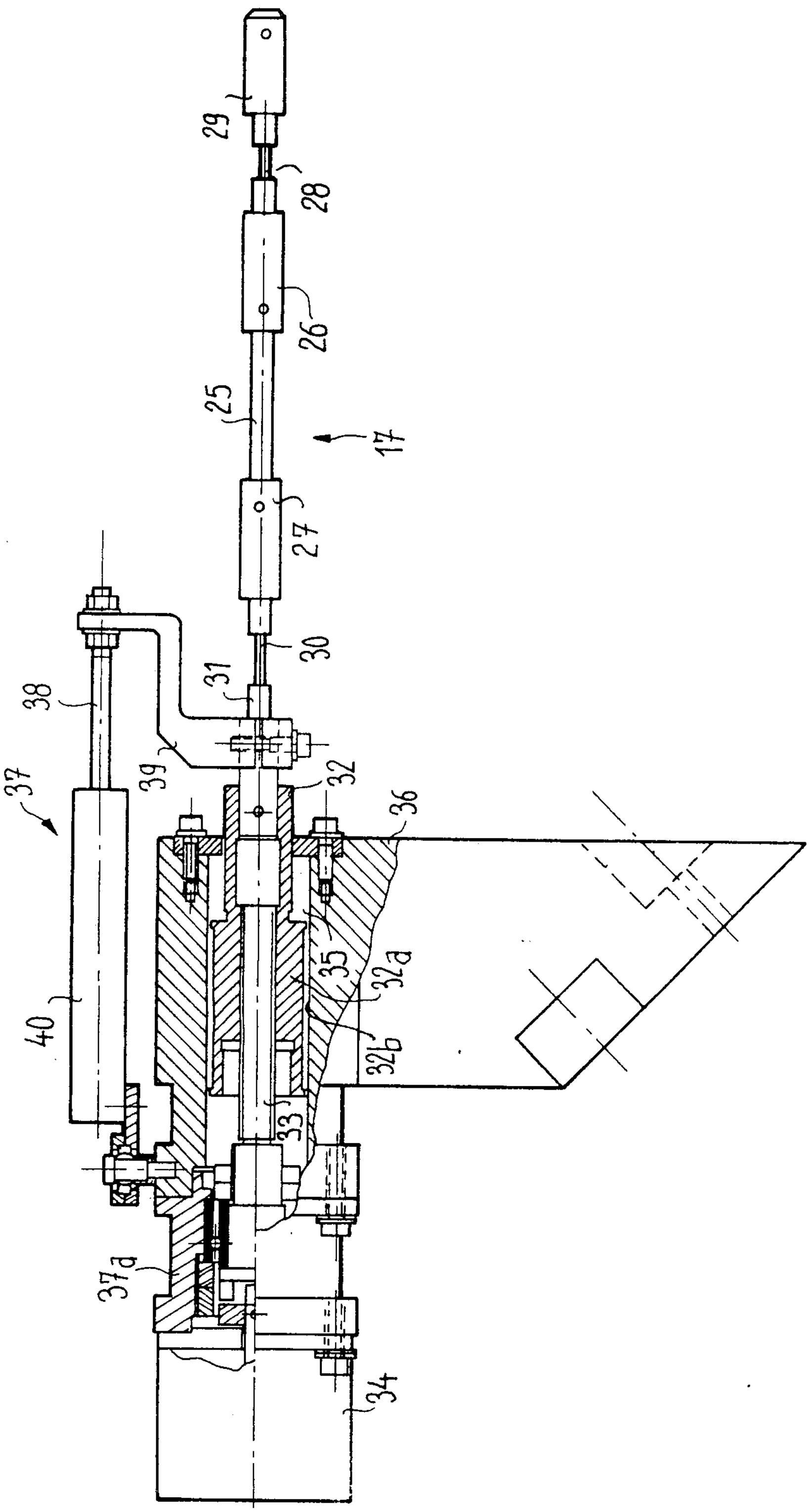
FIG. 4 is a detailed view of an element for adjustment of the position of the platform.

An embodiment of an arm, for example that denoted by 17, and of the actuation of its displacement, will now be described with reference to FIG. 4.

This arm comprises a rigid rod 25 having sleeves 26, 27 secured to its extremities. The sleeve 26 at the upper extremity of the rod 25 houses a definite length of a cylindrical rod 28 of small diameter which is both robust and flexible, for example being of the piano wire type. The upper extremity of this rod 28 of small diameter is equally inserted into a sleeve 29 secured under the platform 11. This rod 28 forms a playfree swivel or knee joint between the sleeves 26 and 29.

In a similar manner, the sleeve 27 at the lower extremity of the rigid rod 25 houses the upper extremity of a rod 30 of the piano wire type identical to the rod 28 and, like the same, forming a playfree swivel joint. The lower extremity of this last-rod 30 is inserted into a sleeve 31 displaceable in accordance with a linear movement, that is to say in a simple translatory motion.

To this end, the sleeve 31 is integral with a cylinder 32 projecting from a piston 32*a* and of which the lower extremity has a screw-thread cooperating with a screw 33 driven in rotation by means of a stepping motor 34. The piston 32*a* has a square cross-section; and at its periphery it has slides 32*b* of plastic material to facilitate sliding within a passage 35 of a structure 36 to which is fastened the support 37*a* of the motor 34. The square cross-section of the piston 32*a* and thus of the passage 35, prevents rotation of this piston; the latter consequently undergoes only a translatory displacement.

The position of the piston 32*a* and consequently that of the sleeve 31 and swivel 30, is measured by means of a transducer 37 which, in this embodiment comprises a rod 38 fastened to the sleeve 31 via a bent arm 39 so that this rod 38 is parallel to the axis common to the sleeve 31 and to the screw 33. For example, this rod 38 actuates the cursor of a potentiometer, the electrical signal across the terminals of this potentiometer then representing the position of the piston 32*a*. The casing 40 of the said transducer 37 is secured to the structure 36, as is the bearer 37*a* of the motor 34.

Figure 3:
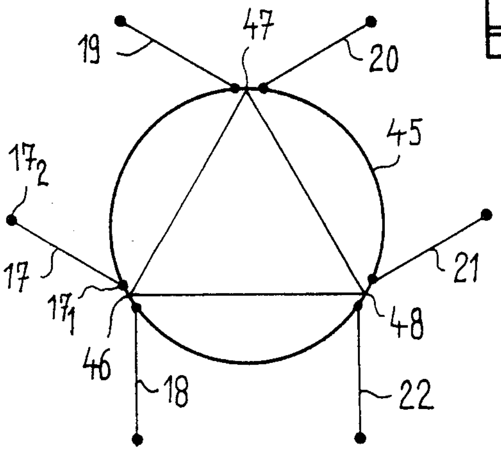
FIG. 3 is a horizontal projection corresponding to FIG. 2.

FIG. 3 diagrammatically illustrates the horizontal projections of the different arms 17 to 22 when the platform 11 is horizontal.

In this projection, the extremity $17_1$ of the arm 17 represents the swivel axis of the swivel 28 and the extremity $17_2$ corresponds to the swivel axis of the swivel 30. Similarly, in FIG. 3, the extremities of each of the other arms correspond to the swivel axes of the upper and lower swivels. The swivel axes of the upper swivels are situated on a circle 45—which has a diameter of 470 mms in this embodiment—in groups of two close to the corners 46,47 and 48 of an equilateral triangle inscribed in this circle 45. The projections of these arms are pependicular to the adjacent sides of the equilateral triangle. Consequently, these projections are parallel in pairs; the projection of the arm 17 is consequently parallel to that of the arm 19.

The arms subtend an angle of 45° with the vertical when the platform 11 is horizontal (this is its initial position). In the horizontal position of the platform 11, the axis of the rod 25 thus coincides with the axis of the sleeve 31. This has the result that the axes of translation are also always inclined at 45° with respect to the vertical.

In this example, the distance between the swivels 28 and 30 is of the order of 160 mms whereas the free length of each of the rods 28 and 30 is 15 mms and its diameter 1.5 mm. For minor flexing, the articulation formed by these rods 28 and 30 acts as though a perfect swivel or knee joint were situated at the middle of the free parts of these rods 28 and 30.

Figure 5:
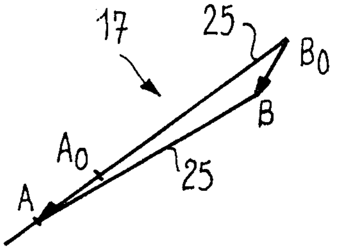
FIG. 5 is a diagram illustrating the operation of the element of FIG. 4.

FIG. 5 is a diagram illustrating the displacement of the arm 17 with its articulations at the extremities, on the one hand in a balanced state in which the axis of translation of the sleeve 31 is aligned with the axis of the rod 25, and on the other hand when the stepping motor 34 is caused to turn in such manner as to cause downward displacement of the sleeve 31, that is to say articulation of the rod 30.

Figure 2:
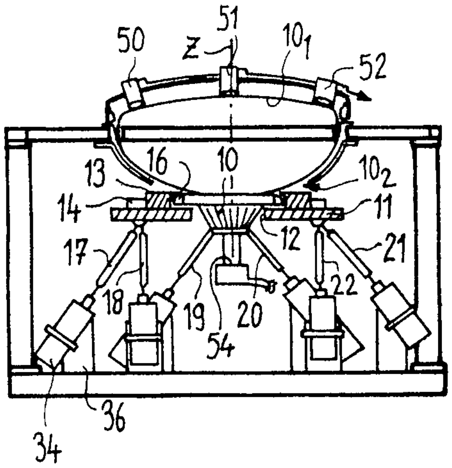
FIG. 2 is a sideview showing the platform, a tube, a deflector and the elements permitting positional adjustment of the platform.

The intitial state of the rod 25 as depicted by the segment $A_OB_O$, $A_O$ and $B_O$ being the articulations of the rods 28 and 30. It corresponds to the horizontal position of the platform 11, for which position the rod $A_OB_O$ is aligned with the axis of translation of the mechanism. Detectors 50,51, 52 (FIG. 2) establish the convergence and purity errors visible on the screen $\mathbf{10}_1$ and a computer (not illustrated) makes it possible to determine, from these measurements, the displacements of the point $B_O$ which should be performed so that the deflector 10 may be displaced in such a manner that after displacement, the defects are corrected in its new position. Consequently in order to secure the correction, the point $B_O$ should be displaced towards the point B (FIG. 5). For this purpose, point $A_O$ should be displaced to A by translatory displacement of the piston *32a*. $A_OB_O$ evidently equals AB, the arm 25 not changing in length between one position and another. Finally, the computer determines whether the translatory displacement $A_OA$ makes it possible to correct the defects measured. The displacements $A_OA$ may obviously be progressive.

The translatory displacements $A_OA$ will all be identical, for example if it is wished to displace the deflector 10 along the vertical axis z.

The apparatus in accordance with the invention only permits small amplitude displacements only of the deflector, which is adequate for adjusting the position of this deflector with respect to the other elements of the color television tube. With respect to three orthogonal axes formed by the conventional symmetry axes of a tube, the apparatus permits rotations of at most plus or minus 3° around each axis and translatory displacements of at most plus or minus 4 mm along each of these axes.

The different elements of the apparatus have negligible play. This applies especially to the articulations, which are play-free. Furthermore, the legs support the platform 11 in a very rigid manner. In this way, the positioning of the platform 11 and consequently of the deflector 10, is always assured in a very precise manner.

The apparatus may be adapted very easily to the different kinds of deflectors. It may equally be applied with minimum modifications for adjustment of the position of deflectors on tubes of different dimensions and/or geometries.

The adaptability of the apparatus results from its six degrees of freedom which permit all the displacements around a reference position. To change from one configuration of a tube deflector to another, the apparatus need not undergo structural modification. It is sufficient to modify the calculation parameters required to assure control of the motors 34 which displace the deflector for correction of the defects measured on the screen of the tube.

The transducers 37 make it possible on the one hand to ascertain the position of each sleeve 31 and on the other hand to check on whether a triggered displacement has actually been performed.

The immobilization of the deflector on the tube after the adjustments have been performed may, like the latter, be established without manual intervention, for example by means of automatic screwdrivers.

To develop the control program for the motors 34 based on the defects measured on the screen, a preliminary calibration of the appartaus is performed as a function of the nature of the tube and deflector. As stated in the foregoing, the deflector displacements which are needed to compensate for the errors measured are calculated by defining six vectors $B_OB$ and then six translatory displacements $A_OA$ controlled by the motors 34.

The means 54 for supplying the tube may easily be housed under the platform 11, by reason of the inclined positioning with respect to the vertical and the uniform distribution around the opening 12 of the arms 17 to 22.

What is claimed is:

1. A deflection yoke adjustment apparatus for a cathode ray tube comprising:

a platform having a central opening therein for receiving a deflection yoke of a tube installed in a housing;

pairs of connection points located on the platform and defining a symmetrical closed geometric pattern, each corner thereof having a pair of connection points;

a plurality of arms connected at first ends thereof to corresponding connection points in oblique angular inclination to a rear surface of the platform to create a substantially symmetrical tapered space in back of the yoke;

actuating means secured to the housing and connected to second ends of respective arms for selectively adjusting the positions of the arms and, hence, the connected platform; and an electrical connector connected to the tube and independent of mechanical contact with the platform;

wherein the inclination of the arms and symmetrical closed pattern spatially distributes stress forces evenly in the arms as well as generating a large workable enlarging tapered space behind the tube for facilitating connection and removal of the connector from the tube.

2. The structure set forth in claim 1 wherein the geometric pattern is an equilateral triangle, and further wherein a pair of arms is connected at each corner of the triangle.

3. An apparatus according to claim 1, wherein each arm comprises a rigid rod having a first extremity articulated to the platform and a second extremity articulated to a device performing simple translatory displacements.

4. An apparatus according to claim 3, wherein each arm further comprises a strong and flexible rod for articulation, the articulated rod forming a swivel joint free from play.

5. An apparatus according to claim 1, wherein the actuating means comprises:

a stepping motor for effecting each of the arms to move along a single degree of freedom, the stepping motor driving a screw which entrains a piston having an internal screw-thread, the piston being guided so that it is movable only translationally.

* * * * *